(12) United States Patent
McBride et al.

(10) Patent No.: US 11,494,237 B2
(45) Date of Patent: Nov. 8, 2022

(54) MANAGING WORKLOADS OF A DEEP NEURAL NETWORK PROCESSOR

(71) Applicant: MICROSOFT TECHNOLOGY LICENSING, LLC, Redmond, WA (US)

(72) Inventors: Chad Balling McBride, North Bend, WA (US); Amol A. Ambardekar, Redmond, WA (US); Boris Bobrov, Kirkland, WA (US); Kent D. Cedola, Belevue, WA (US); George Petre, Redmond, WA (US); Larry Marvin Wall, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 232 days.

(21) Appl. No.: 16/454,026

(22) Filed: Jun. 26, 2019

(65) Prior Publication Data
US 2020/0409757 A1 Dec. 31, 2020

(51) Int. Cl.
*G06F 9/46* (2006.01)
*G06F 9/50* (2006.01)
*G06N 3/04* (2006.01)

(52) U.S. Cl.
CPC ............ *G06F 9/505* (2013.01); *G06F 9/5094* (2013.01); *G06N 3/04* (2013.01); *G06F 2209/5018* (2013.01)

(58) Field of Classification Search
CPC .... G06F 1/3203; G06F 1/3228; G06F 9/5094; G06F 15/80; Y02D 10/00
See application file for complete search history.

(56) References Cited

U.S. PATENT DOCUMENTS 9,424,079 B2    8/2016  Rossbach et al.
10,162,632 B1 * 12/2018  Farooqui ............... G06F 7/5443
(Continued)

FOREIGN PATENT DOCUMENTS

WO    2018222522 A1    12/2018

OTHER PUBLICATIONS

"International Search Report & Written Opinion issued in PCT Application No. PCT/US20/031254", dated Jul. 21, 2020, 12 Pages.
(Continued)

*Primary Examiner* — Kenneth Tang
(74) *Attorney, Agent, or Firm* — Newport IP, LLC; Leonard J. Hope (57) ABSTRACT

A computing system includes processor cores for executing applications that utilize functionality provided by a deep neural network ("DNN") processor. One of the cores operates as a resource and power management ("RPM") processor core. When the RPM processor receives a request to execute a DNN workload, it divides the DNN workload into workload fragments. The RPM processor then determines whether a workload fragment is to be statically allocated or dynamically allocated to a DNN processor. Once the RPM processor has selected a DNN processor, the RPM enqueues the workload fragment on a queue maintained by the selected DNN processor. The DNN processor dequeues workload fragments from its queue for execution. Once execution of a workload fragment has completed, the DNN processor generates an interrupt indicating that execution of the workload fragment has completed. The RPM processor can then notify the processor core that originally requested execution of the workload fragment.

7 Claims, 6 Drawing Sheets

(56) References Cited

U.S. PATENT DOCUMENTS

| | | | |
|---|---|---|---|
| 2003/0023885 A1* | 1/2003 | Potter | G06F 1/3209 |
| | | | 713/300 |
| 2008/0115143 A1* | 5/2008 | Shimizu | G06F 9/5066 |
| | | | 718/105 |
| 2011/0239020 A1* | 9/2011 | Thomas | G06F 1/3287 |
| | | | 713/323 |
| 2012/0054771 A1 | 3/2012 | Krishnamurthy et al. | |
| 2012/0180056 A1 | 7/2012 | Sander et al. | |
| 2015/0363239 A1 | 12/2015 | Hsu et al. | |
| 2016/0198000 A1 | 7/2016 | Gorshechnikov et al. | |
| 2017/0068889 A1 | 3/2017 | Fougner et al. | |
| 2017/0124451 A1 | 5/2017 | Barham et al. | |
| 2017/0124452 A1 | 5/2017 | Tucker et al. | |
| 2017/0169329 A1* | 6/2017 | Doniwa | H04L 67/1002 |
| 2018/0293205 A1* | 10/2018 | Koker | G06N 3/0445 |
| 2018/0293490 A1 | 10/2018 | Ma et al. | |
| 2018/0293498 A1* | 10/2018 | Campos | G06F 8/31 |
| 2019/0155368 A1* | 5/2019 | Branover | G06F 1/3296 |
| 2019/0180176 A1* | 6/2019 | Yudanov | G06N 3/08 |
| 2019/0286215 A1* | 9/2019 | Paul | F24F 11/62 |
| 2019/0311257 A1* | 10/2019 | Chang | G06N 3/08 |
| 2019/0325304 A1* | 10/2019 | Gottin | G06N 3/08 |
| 2020/0012531 A1* | 1/2020 | Li | G06F 9/5088 |
| 2020/0073469 A1* | 3/2020 | Sadowski | G06F 1/324 |
| 2020/0151088 A1* | 5/2020 | Gu | G06F 30/343 |
| 2020/0174828 A1* | 6/2020 | Manula | G06F 9/5027 |
| 2020/0210834 A1* | 7/2020 | D'Ercoli | G06F 9/5072 |
| 2020/0241921 A1* | 7/2020 | Calmon | G06F 30/20 |
| 2020/0327420 A1* | 10/2020 | Aralikatte | G06N 3/10 |

OTHER PUBLICATIONS

Chilimbi, et al., "Project Adam: Building an Efficient and Scalable Deep Learning Training System", In Proceedings of the 11th USENIX Conference on Operating Systems Design and Implementation, Oct. 6, 2014, 13 Pages.

Yan, et al., "SERF: Efficient Scheduling for Fast Deep Neural Network Serving via Judicious Parallelism", In Proceedings of the International Conference for High Performance Computing, Networking, Storage and Analysis, Nov. 13, 2016, 12 Pages.

* cited by examiner

MANAGING WORKLOADS OF A DEEP NEURAL NETWORK PROCESSOR

BACKGROUND

Deep neural networks ("DNNs") are loosely modeled after information processing and communication patterns in biological nervous systems, such as the human brain. DNNs can be utilized to solve complex classification problems such as, but not limited to, object detection, semantic labeling, and feature extraction. As a result, DNNs form the foundation for many artificial intelligence ("AI") applications, such as computer vision, speech recognition, and machine translation. DNNs can match or exceed human accuracy in many of these domains.

The high-level of performance of DNNs stems from their ability to extract high-level features from input data after using statistical learning over a large data set to obtain an effective representation of an input space. However, the superior performance of DNNs comes at the cost of high computational complexity. High performance general-purpose processors, such as graphics processing units ("GPUs"), are commonly utilized to provide the high level of computational performance required by many DNN applications.

While general-purpose processors, like GPUs, can provide a high level of computational performance for implementing DNNs, these types of processors are typically unsuitable for use in performing DNN operations over long durations in computing devices where low power consumption is critical. For example, general-purpose processors, such as GPUs, can be unsuitable for use in performing long-running DNN tasks in battery-powered portable devices, like smartphones or alternate/virtual reality ("AR/VR") devices, where the reduced power consumption is required to extend battery life.

Reduced power consumption while performing continuous DNN tasks, such as detection of human movement, can also be important in non-battery-powered devices, such as a power-over-Ethernet ("POE") security camera for example. In this specific example, POE switches can provide only a limited amount of power; reducing the power consumption of POE devices like security cameras permits the use of POE switches that provide less power.

Application-specific integrated circuits ("ASICs") have been developed that can provide performant DNN processing while at the same time reducing power consumption as compared to general-purpose processors. Despite advances in this area, however, there is a continued need to improve the performance and reduce the power consumption of ASICs that perform DNN processing, particularly for use in computing devices where the low power consumption is critical.

It is with respect to these and other technical challenges that the disclosure made herein is presented.

SUMMARY

Technologies are disclosed for managing workloads of a DNN processor. Through implementations of the disclosed technologies, workloads for a DNN processor can be scheduled in a manner that reduces the amount of time a DNN processor is idle between processing of workloads as compared to previous solutions. Reducing the idle time between workloads enables a DNN processor to complete the processing of workloads more quickly, thereby allowing the DNN processor to also be powered off more quickly in order to conserve power. Other technical benefits not specifically mentioned herein can also be realized through implementations of the disclosed subject matter.

In order to realize the technical benefits mentioned briefly above, a computing system is configured with processor cores for executing applications that solve classification and related problems. For example, and without limitation, the processor cores might be configured to execute applications for performing object detection, semantic labeling, or feature extraction. In order to perform these tasks, and others, the applications executing on the processor cores can utilize functionality provided by a DNN processor, or processors. The DNN processors are configured to implement recall-only neural networks and can programmatically support a wide variety of network structures.

In one embodiment, one of the processor cores operates as a resource and power management ("RPM") processor core. As will be described in greater detail below, the RPM processor core is configured to, among other things, manage the allocation of workload fragments to DNN processors. In particular, the RPM processor core receives requests from other processor cores to execute DNN workloads. The DNN workloads include or specify data used by the DNN processors to perform DNN-related tasks.

Responsive to receiving a request to execute a DNN workload, the RPM processor divides the DNN workload into workload fragments. The RPM processor then determines whether a workload fragment is to be statically allocated or dynamically allocated to a DNN processor. Workload fragments that are to be statically allocated might identify a particular DNN processor to which they are to be allocated. In this way, the RPM processor can assign such a workload fragment to a predetermined DNN processor. Workload fragments that are not statically assigned to a DNN processor are dynamically assigned to a DNN processor for execution in the manner described below.

The RPM processor can dynamically assign a workload fragment to a DNN processor based upon the estimated time to completion of workload fragments currently executing on the DNN processors. In order to determine the estimated time to completion of currently executing workload fragments, data (which might be referred to herein as an "execution time scoreboard") can be maintained that indicates a percentage of the execution time of a workload fragment that has completed. The workload fragments can update this data as they execute. For example, a workload fragment might store data indicating that it has completed 25% of its execution.

The RPM processor can assign a workload fragment to the DNN processor that will complete the execution of its current workload fragment the soonest, thereby minimizing the amount of time that the DNN processors are idle between execution of workload fragments. As discussed above, this enables the DNN processors to complete their assigned computations more quickly, thereby enabling the DNN processors to be powered down sooner in order to save power. The RPM processor core can be configured to cause power to be removed from a DNN processor if it determines that the DNN processor is idle.

Once the RPM processor has selected a DNN processor for a workload fragment, the RPM enqueues the workload fragment on a queue (which might be referred to herein as a "workload fragment queue") maintained by the DNN processor. The DNN processor, in turn, dequeues workload fragments from the queue for execution. Once execution of a workload fragment has completed, the DNN processor generates an interrupt. An interrupt handler processes the interrupt and generates a message to the RPM processor indicating that execution of the workload fragment has completed. The RPM processor can then notify the processor core that originally requested execution of the workload fragment. Once all of the workload fragments for a workload have been processed in this manner, the processor core can combine the results of their execution into a final result.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for managing workloads associated with a DNN processor. As discussed briefly above, implementations of the disclosed technologies can reduce the amount of time that a DNN processor is idle between workloads, thereby enabling the DNN processor to complete its processing and to be powered off more quickly in order to conserve power. Other technical benefits not specifically mentioned herein can also be realized through implementations of the disclosed subject matter.

While the subject matter described herein is presented in the general context of a hardware DNN processor, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of technologies for managing the workload of a DNN processor will be described.

Figure 1:
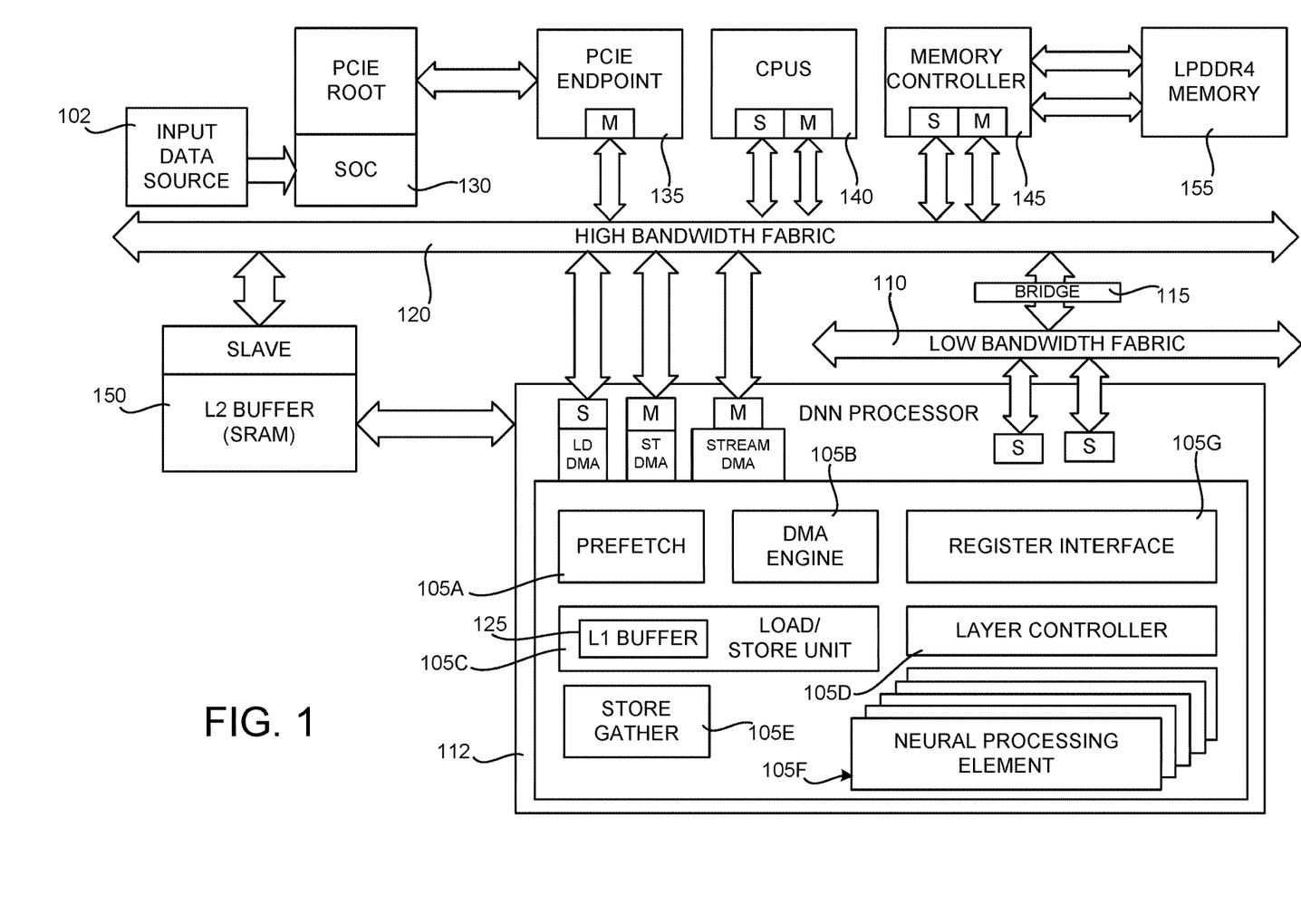
FIG. 1 is a computing architecture diagram that shows aspects of the configuration and operation of a DNN processor that implements aspects of the technologies disclosed herein, according to one embodiment.

FIG. 1 is a computing architecture diagram that shows aspects of the configuration and operation of a processing system that implements the technologies disclosed herein, according to one embodiment. The processing system disclosed herein is configured in some embodiments to solve classification problems (and related problems) such as, but not limited to, eye tracking, hand tracking, object detection, semantic labeling, and feature extraction.

In order to provide this functionality, a DNN processor 112 is provided that can implement a recall-only neural network and programmatically support a wide variety of network structures. Training for the network implemented by the DNN processor 112 can be performed offline in a server farm, data center, or another suitable computing environment. The result of training a DNN is a set of parameters that can be known as "weights" or "kernels." These parameters represent a transform function that can be applied to an input with the result being a classification or semantically labeled output.

The DNN processor 112 disclosed herein can be considered a superscalar processor. The DNN processor 112 can dispatch one or more instructions to multiple execution units, called neural processing elements 105F. The execution units can be "simultaneous dispatch simultaneous complete," where each execution unit is synchronized with each of the other execution units. The DNN processor 112 can be classified as a single instruction stream, multiple data stream ("SIMD") architecture.

A neural processing element 105F is the base unit in artificial neural networks that is used to model a biological neuron in the brain. The model of a neural processing element 105F can include the inner product of an input vector with a weight vector added to a bias, with an activation function applied.

Each neural processing element 105F in the DNN processor 112 is capable of performing weighted sum, max pooling, bypass, and potentially other types of operations. The neural processing elements 105F process input and weight data every clock cycle. Each neural processing element 105F is synchronized to all other neural processing elements 105F in terms of progress within a kernel to minimize the flow of kernel data within the DNN processor 112.

Each neural processing element 105F can contain a multiplier, an adder, a comparator, and a number of accumulators (not shown in FIG. 1). By having multiple accumulators, the neural processing elements 105F are able to maintain context for multiple different active kernels at a time. Each accumulator is capable of being loaded from a read of the SRAM 150 (described below). The accumulators can sum themselves with the contents of other accumulators from other neural processing elements 105F.

The DNN processor 112 accepts planar data as input, such as image data. Input to the DNN processor 112 is not, however, limited to image data. Rather, the DNN processor 112 can operate on any input data presented to the DNN processor 112 in a uniform planar format. In one particular embodiment, the DNN processor 112 can accept as input multi-planar one-byte or two-byte data frames.

Each input frame can be convolved with an N×K×H×W set of kernels, where N is the number of kernels, K is the number of channels per kernel, H is the height, and W is the width. Convolution is performed on overlapping intervals across the input data where the interval is defined by strides in the X and Y directions. These functions are performed by the neural processing elements 105F and managed by the DNN processor 112 and software-visible control registers. Other types of operations might also be performed including, but not limited to, fully connected, batch normalization, and other types of operations.

The DNN processor 112 supports multiple data types: weights; input data/feature maps; activation data; biases; and scalars. Input data/feature maps and activation data are, in most cases, two names for the same data with the distinction that when referring to an output of a layer the term activation data is used. When referring to the input of a layer the term input data/feature map is used.

The neural processing elements 105F in the DNN processor 112 compute a weighted sum of their inputs and pass the weighted sum through an "activation function" or "transfer function." The transfer function commonly has a sigmoid shape but might also take on the form of a piecewise linear function, step function, or another type of function. The activation function allows the neural processing elements 105F to train to a larger set of inputs and desired outputs where classification boundaries are non-linear.

The DNN processor 112 operates on a list of layer descriptors which correspond to the layers of a neural network. The list of layer descriptors can be treated by the DNN processor 112 as instructions. These descriptors can be pre-fetched from memory into the DNN processor 112 and executed in order. The descriptor list acts as a set of instructions to the DNN processor 112. In some configurations, two types of instructions are utilized: layer descriptors; and program instructions that get executed on a sequence controller. Software tools and/or compilers can be executed on devices external to the DNN processor 112 to create the descriptor lists that are executed on the DNN processor 112.

Generally, there can be two main classes of descriptors: memory-to-memory move ("M2M") descriptors; and operation descriptors. M2M descriptors can be used to move data to/from the main memory to/from a local buffer (i.e. the buffer 125 described below) for consumption by the operation descriptors. M2M descriptors follow a different execution pipeline than the operation descriptors. The target pipeline for M2M descriptors can be the internal DMA engine 105B or the configuration registers 105G, whereas the target pipeline for the operation descriptors can be the neural processing elements 105F.

Operational descriptors specify a specific operation that the neural processing elements 105F should perform on a data structure located in local static random-access memory ("SRAM") memory. The operational descriptors are processed in order and are capable of many different layer operations, at least some of which are described herein.

As illustrated in FIG. 1, the DNN processor 112 has a memory subsystem with a unique L1 and L2 buffer structure. The L1 and L2 buffers shown in FIG. 1 are designed specifically for neural network processing. By way of example, the L2 buffer 150 can maintain a selected storage capacity with a high speed private interface operating at a selected frequency. The L1 buffer 125 can maintain a selected storage capacity that can be split between kernel and activation data. The L1 buffer 125 might be referred to herein as the "buffer 125," and the L2 buffer 150 might be referred to herein as the SRAM 150.

Computational data (i.e. inputs data, weights and activation data) is stored in the SRAM 150 row-major in some embodiments. The computational data can be organized as two buffers, where one buffer contains input data, which might be referred to herein as the "input buffer," and the other buffer, which might be referred to herein as the "weight buffer," contains kernel weights. The buffers are filled from the SRAM 150 by the load/store unit 105C. Data is accumulated in each buffer until it has reached its predetermined capacity. The buffer data is then copied to a shadow buffer in some embodiments and presented to the neural processing elements 105F.

The DNN processor 112 can also comprise a number of other components including, but not limited to, a register interface 105G, a prefetch unit 105A, a store/gather unit 105E, a layer controller 105D, and a register interface 105G. The DNN processor 112 can include additional or alternate components in some embodiments.

The DNN processor 112 operates in conjunction with other external computing components in some configurations. For example, the DNN processor 112 is connected to a host application processor system on chip ("the host SoC") 130 in some embodiments. The DNN processor 112 can be connected to the host SoC 130 through a PCIe interface, for example. Appropriate PCIe components, such as the PCIe endpoint 135 can be utilized to enable these connections.

The Host SoC 130 serves as the application processor for the DNN processor 112. The main operating system, application, and auxiliary sensor processing are performed by the host SoC 130. The host SoC 130 can also be connected to an input data source 102, such as an external camera, that provides input data, such as image data, to the DNN processor 112. Additional central processing units ("CPUs" or "processors"), such as TENSILICA nodes 140, can also be utilized to coordinate the operation of the DNN processor 112, aspects of which will be described below.

DDR DRAM 155 can also be connected to the host SoC 130 that can be used as the main system memory. This memory is accessible from the host SoC 130 across the high bandwidth fabric 120 (e.g. PCIe bus) by way of a memory controller 145. The high bandwidth fabric 120 provides bidirectional direct memory access ("DMA") small messaging transactions and larger DMA transactions. A bridge 115 and low bandwidth fabric 110 can connect the DNN processor 112 to the host SoC 130 for sub-module configuration and other functions.

The DNN processor 112 can include a DMA engine 105B that is configured to move data to and from main memory 155. The DMA engine 105B has two channels in some embodiments. One channel is dedicated to fetching operation descriptors while the other channel is dedicated to M2M operations. A DMA descriptor can be embedded in the M2M descriptor. Descriptors in this context are DMA descriptors that are used to move the contents of memory, not to be confused with the operation descriptors described above.

To offload the local SRAM memory 150, and to provide more space for input data and weight data, the activation output can optionally be streamed directly to DDR memory 155. When streaming data to DDR memory 155, the DNN processor 112 will accumulate enough data for a burst transaction on the high bandwidth fabric 120 and will buffer enough transactions to minimize backpressure on the neural processing elements 105F. Additional details regarding the operation of the DNN processor 112 will be provided below.

Figure 2:
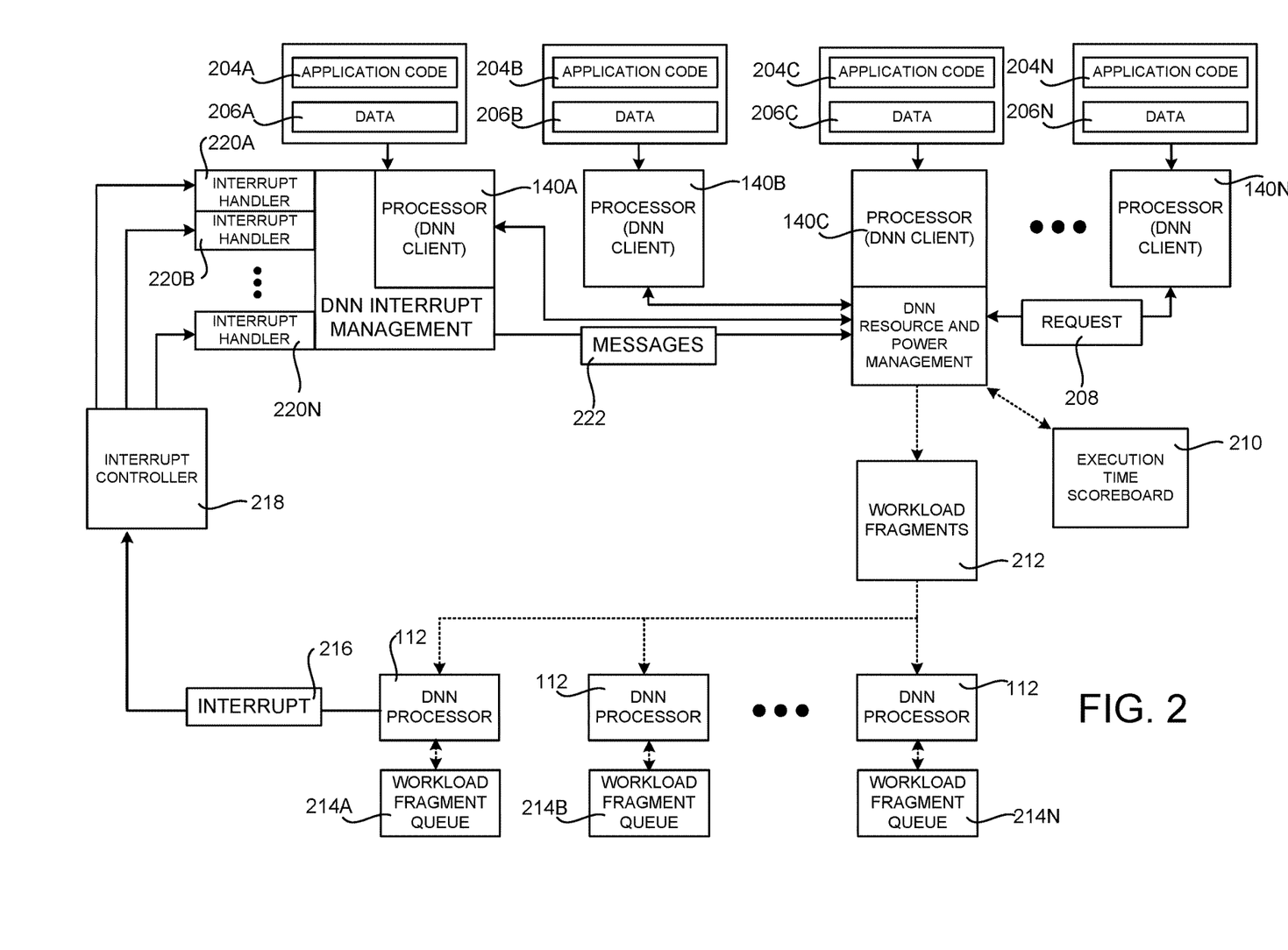
FIG. 2 is a computing architecture diagram showing aspects of one mechanism disclosed herein for management of workloads for a DNN processor, according to one embodiment.

FIG. 2 is a computing architecture diagram showing aspects of a computing system configured for managing workloads for the DNN processors 112, according to one embodiment. As shown in FIG. 2, a computing device can be configured with multiple DNN processors 112. The computing device can also be configured with processor cores 140A-140N (which might be referred to herein as "processors" or "central processing units (CPUs)") for executing program code that solves classification and related problems. In one embodiment, the processor cores 140 are TENSILICA cores.

As described briefly above, the processor cores 140A-140N might be configured to execute application code 204A-204N, respectively, for performing object detection, semantic labeling, or feature extraction. In order to perform these tasks, and others, the application code 204A-204N executing on the processor cores 140A-140N, respectively, can utilize functionality provided by a DNN processor 112, or processors 112. As discussed in detail above, the DNN processors 112 are configured to implement recall-only neural networks and can programmatically support a wide variety of network structures.

In one embodiment, one of the processor cores, the processor core 140C in the illustrated example, operates as a resource and power management ("RPM") processor core. As will be described in greater detail below, the RPM processor core 140C is configured to, among other things, manage the allocation of workload fragments 212 to DNN processors. In particular, the RPM processor core 140C receives requests 208 from other processor cores to execute DNN workloads. In the illustrated example, the processor core 140N has provided a request 208 to execute a DNN workload to the RPM processor core 140C.

DNN workloads include or specify data used by the DNN processors 122 to perform DNN-related tasks. For example, and without limitation, the workload fragments 212 can include or reference data 206-206N, respectively, defining a network structure for a DNN, kernels, and input data, such as data generated by a sensor like a camera. The DNN processors 112 can utilize the data 206 to perform DNN processing in the manner described above with regard to FIG. 1.

Responsive to receiving a request 208 to execute a DNN workload, the RPM processor core 140C divides the DNN workload into workload fragments 212. For example, and without limitation, the RPM processor core 140C might divide a DNN workload for performing a convolution operation into multiple workload fragments 212 each including a portion of the total workload.

Once the RPM processor core 140C has divided the DNN workload into workload fragments 212, the RPM processor core 140C then determines whether one of the workload fragments is to be statically allocated or dynamically allocated to a DNN processor 112. Workload fragments 212 that are to be statically allocated might include or reference data identifying a particular DNN processor 112 to which they are to be assigned. In this way, a DNN workload can specify the particular DNN processor 112 to use, and the RPM processor 112 can assign fragments 212 of a DNN workload to a predetermined DNN processor 112.

Workload fragments 212 that are not statically assigned to a DNN processor 112 are dynamically assigned to a DNN processor 112 for execution in the manner described below. For example, and without limitation, the RPM processor core 140C can dynamically assign a workload fragment 212 to a DNN processor 112 based upon the estimated time to completion of workload fragments 212 currently executing on the DNN processors 112.

In order to determine the estimated time to completion of currently executing workload fragments 212, data (which might be referred to herein as an "execution time scoreboard 210") can be maintained that indicates a percentage of the execution time of a workload fragment 212 that has been completed. This data can be maintained for each of the workload fragments 212 currently executing on the DNN processors 212. The workload fragments 212 can update the execution time scoreboard 210 as they execute. For example, a workload fragment 212 might store data indicating that it has completed 25% of its execution, 50% of its execution, and so on. The entry in the execution time scoreboard 210 for a workload fragment 212 can be removed from the execution time scoreboard 210 once the workload fragment 212 has completed execution.

Using the data stored in the execution time scoreboard 210, the RPM processor core 140C can assign a workload fragment 212 to the DNN processor 112 that will complete the execution of its current workload fragment 212 the soonest, thereby minimizing the amount of time that the DNN processors 112 are idle between execution of workload fragments 212. As discussed above, this enables the DNN processors 112 to complete their assigned workloads more quickly, thereby enabling the DNN processors 112 to be powered down sooner in order to save power. The RPM processor core 140C core can be configured to cause power to be removed from a DNN processor 112 if it determines that the DNN processor 112 is idle.

Once the RPM processor core 140C has selected a DNN processor 112 for a workload fragment 212, the RPM processor core 140C enqueues the workload fragment 212 on a queue (which might be referred to herein as a "workload fragment queue 214A-214N") maintained by the DNN processor 112 to which the workload fragment 212 is assigned. The enqueued workload fragment 212 can include a based address of a descriptor list in memory, a number of descriptors to execute, and a memory address for storing results. The DNN processor 112 to which the workload fragment 212 has been assigned, in turn, dequeues workload fragments 212 from the queue 214 for execution.

Once execution of a workload fragment 212 has completed, the DNN processor 112 upon which the workload fragment 212 generates an interrupt 216 to an interrupt controller 218. An interrupt handler 220A-220N associated with the interrupt processes the interrupt 218 and generates a message 222 to the RPM processor 140C indicating that execution of the workload fragment 212 has completed. As shown in FIG. 2, one of the processor cores 140, the processor 140C in this example, can perform interrupt management functionality, such as generating messages 222 to the RPM processor core 140C.

The RPM processor core 140C can then notify the processor core 140 that originally requested execution of the workload fragment 212 that execution of the workload fragment 212 has completed. In the illustrated example, for instance, the RPM processor core 140C notifies the processor core 140N that execution of the workload fragment 212 has completed. Once all of the workload fragments 212 for a workload have been processed and executed in the manner described above, the processor core 140 associated with the workload can combine the results of their execution into a final result for use by the application code 204. Additional details regarding the process described above will be provided below with regard to FIGS. 3 and 4.

Figure 3:
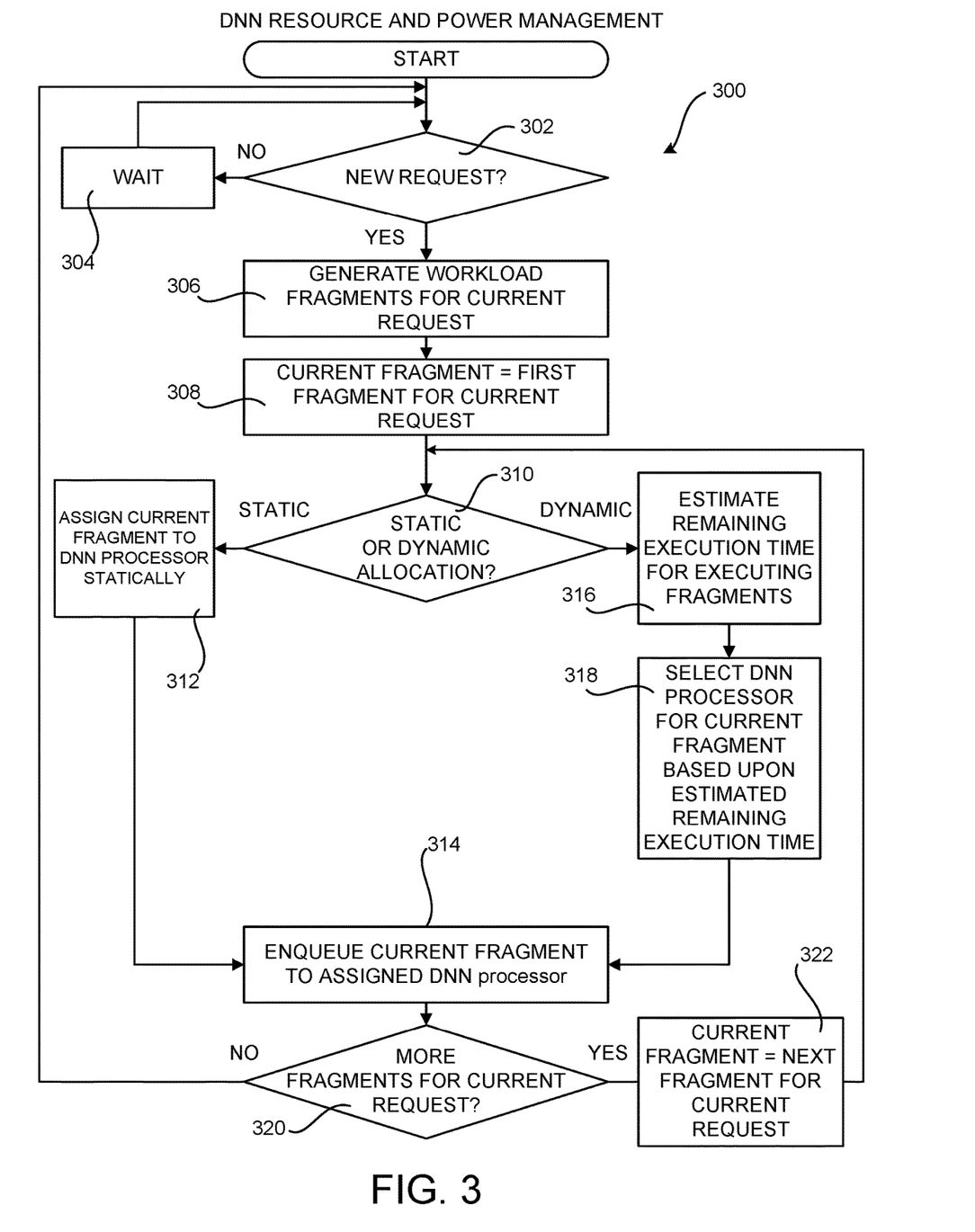
FIG. 3 is a flow diagram showing a routine that illustrates aspects of the operation of the techniques for management of workloads for a DNN processor described with reference to FIGS. 1 and 2, according to one embodiment disclosed herein.

FIG. 3 is a flow diagram showing a routine 300 that illustrates aspects of the operation of the mechanism for management of workloads for a DNN processor 112 described above with reference to FIGS. 1 and 2, according to one embodiment disclosed herein. It should be appreciated that the logical operations described herein with regard to FIG. 3, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300 begins at operation 302, where the RPM processor core 140C determines whether a new request 208 to process a DNN workload has been received. If a request 208 has not been received, the routine 300 proceeds from operation 302 to operation 304, where the RPM processor core 140C waits for a new request 208. The routine 300 then proceeds from operation 304 back to operation 302.

If a new request 208 has been received, the routine 300 proceeds from operation 302 to operation 306, where the RPM processor core 140C generates workload fragments 212 for the DNN workload identified by the new request 208. Once the workload fragments 212 have been generated, the routine 300 proceeds from operation 306 to operations 308 and 310, where the RPM processor core 140C determines whether the first workload fragment 212 is to be statically or dynamically allocated to a DNN processor 112.

As discussed above, a workload fragment 212 to be statically assigned to a DNN processor 112 can specify a particular DNN processor 112 to which it is to be assigned. In this instance, the routine 300 proceeds from operation 310 to operation 312, where the RPM processor core 140C assigns the workload fragment 212 to the predetermined DNN processor 112. The routine 300 then proceeds from operation 312 to operation 314, where the RPM processor core 140C enqueues the workload fragment 212 on the workload fragment queue 214 of the DNN processor 112 to which the workload fragment 212 is to be assigned. The routine 300 then proceeds from operation 320, described below.

If the current workload fragment 212 is not to be statically assigned to a DNN processor 112, the routine 300 proceeds from operation 310 to operation 316. At operation 316, the RPM processor core 140C estimates the remaining execution time for the workload fragments 212 currently executing on the DNN processors 112. As discussed above, data stored in the execution time scoreboard 210 can be retrieved to estimate the amount of time until the currently executing workload fragments 212 complete their execution.

From operation 316, the routine 300 proceeds to operation 318, where the RPM processor core 140C selects a DNN processor 112 for the current workload fragment 212 based upon the estimated time remaining for the currently executing workload fragments 212. For example, the RPM processor core 140C might select the DNN processor 112 executing a workload fragment 212 with the smallest amount of time remaining before it completes execution.

From operation 318, the routine 300 proceeds to operation 314, where the RPM processor core 212 enqueues the current workload fragment 212 on the queue 214 maintained by the DNN processor 112 selected at operation 318. The routine 300 then proceeds from operation 314 to operation 320, where the RPM processor core 140C determines if additional workload fragments 212 need to be assigned for a workload. If so, the routine 300 proceeds from operation 320 to operations 322 and 310, where the next workload fragment 212 for the current workload can be processed in the manner described above. If no additional workload fragments 212 remain to be processed for the current workload, the routine 300 proceeds from operation 320 to operation 320 where another request 208 can be processed in the manner described above.

Figure 4:
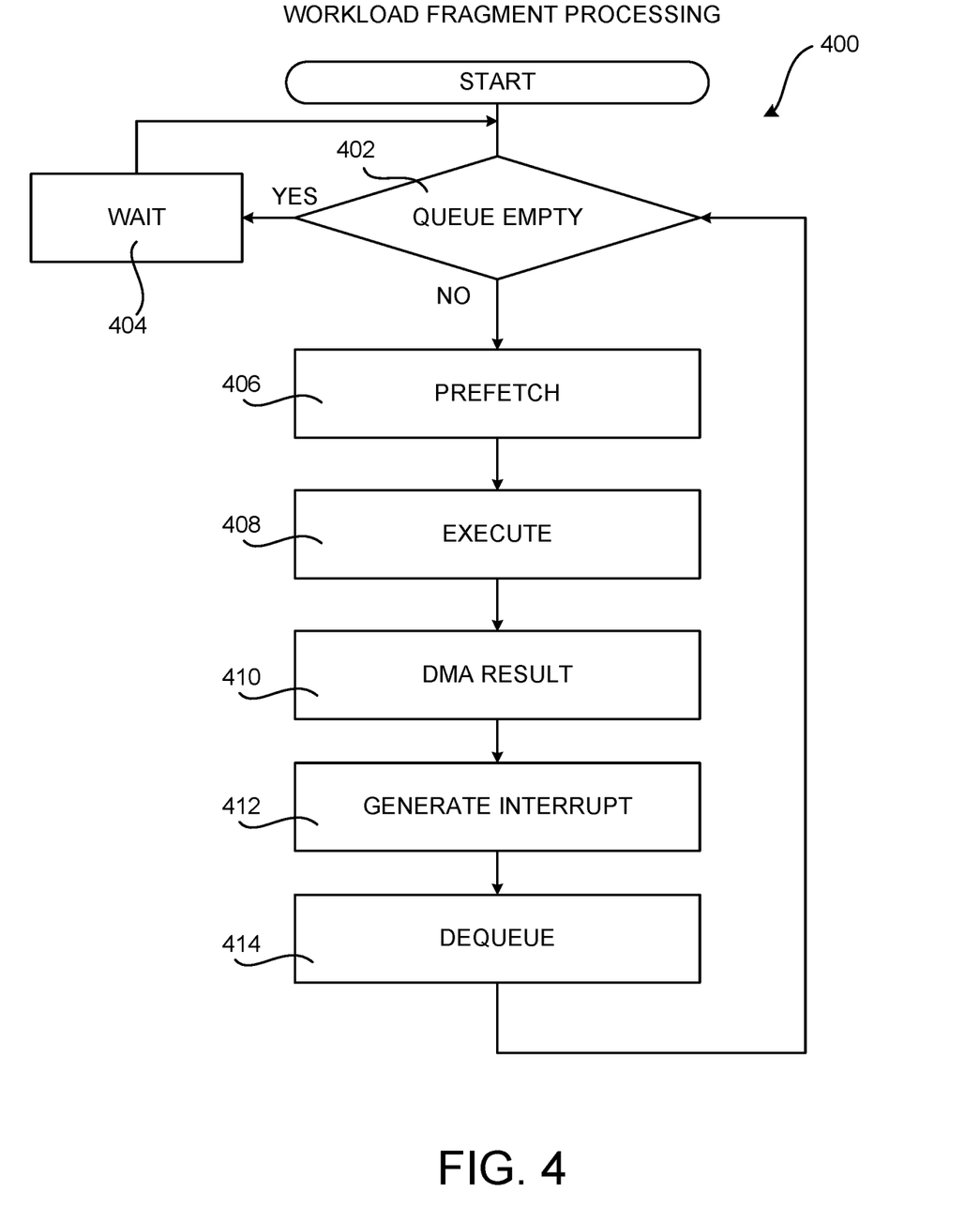
FIG. 4 is a flow diagram showing a routine that illustrates additional aspects of the operation of the techniques for management of workloads for a DNN processor described with reference to FIGS. 1-3, according to one embodiment disclosed herein.

FIG. 4 is a flow diagram showing a routine 400 that illustrates additional aspects of the operation of the mechanism for management of workloads for a DNN processor 112 described above with reference to FIGS. 1-3, according to one embodiment disclosed herein. In particular, FIG. 4 illustrates aspects of the processing performed by the DNN processors 112 when processing workload fragments 212.

The routine 400 begins at operation 402, where a DNN processor 112 determines if its workload fragment queue 214 is empty. If the workload fragment queue 214 is empty, the routine 400 proceeds to operation 404, where the DNN processor 112 might wait a predetermined period of time before checking the workload fragment queue 214 again. The routine 400 then proceeds from operation 404 back to operation 402, where another check of the workload fragment queue 214 can be made.

If, at operation 402, the DNN processor 112 determines that its workload fragment queue 214 is not empty, the routine 400 proceeds from operation 402 to operation 406, where the DNN processor 400 retrieves a workload fragment 212 from its queue 214 and prefetches the data 206 associated with the workload fragment 212. As discussed above, the data 206 might include, but is not limited to, data defining a network structure for a DNN, kernels for use by the DNN, and input data to the DNN, such as data generated by a sensor, like a camera. Once the data 206 has been prefetched, the routine 400 proceeds from operation 406 to operation 408.

At operation 408, the DNN processor 112 executes the workload fragment 212 in the manner described above with regard to FIG. 1. Once execution has completed, the routine 400 proceeds from operation 408 to operation 410, where the DNN processor 112 performs a DMA operation to store the results of the execution of the workload fragment 212 in memory.

Subsequently, the routine 400 proceeds from operation 410 to operation 412, where the DNN processor 112 generates an interrupt 216. As discussed above, generation of the interrupt 216 generates an interrupt 216 to an interrupt controller 218. Causes an interrupt handler 220 associated with the interrupt 216 to generate a message 222 to the RPM processor 140C indicating that execution of the workload fragment 212 has completed. The RPM processor 140C can then notify the processor core 140 that originally requested execution of the workload fragment 212 that execution of the workload fragment 212 has completed.

From operation 412, the routine 400 proceeds to operation 414, where the DNN processor 112 dequeues the workload fragment 212 from its workload fragment queue 214. The routine 400 then proceeds from operation 414 back to operation 402, described above, where another workload fragment 212 can be immediately executed in a similar manner.

Figure 5:
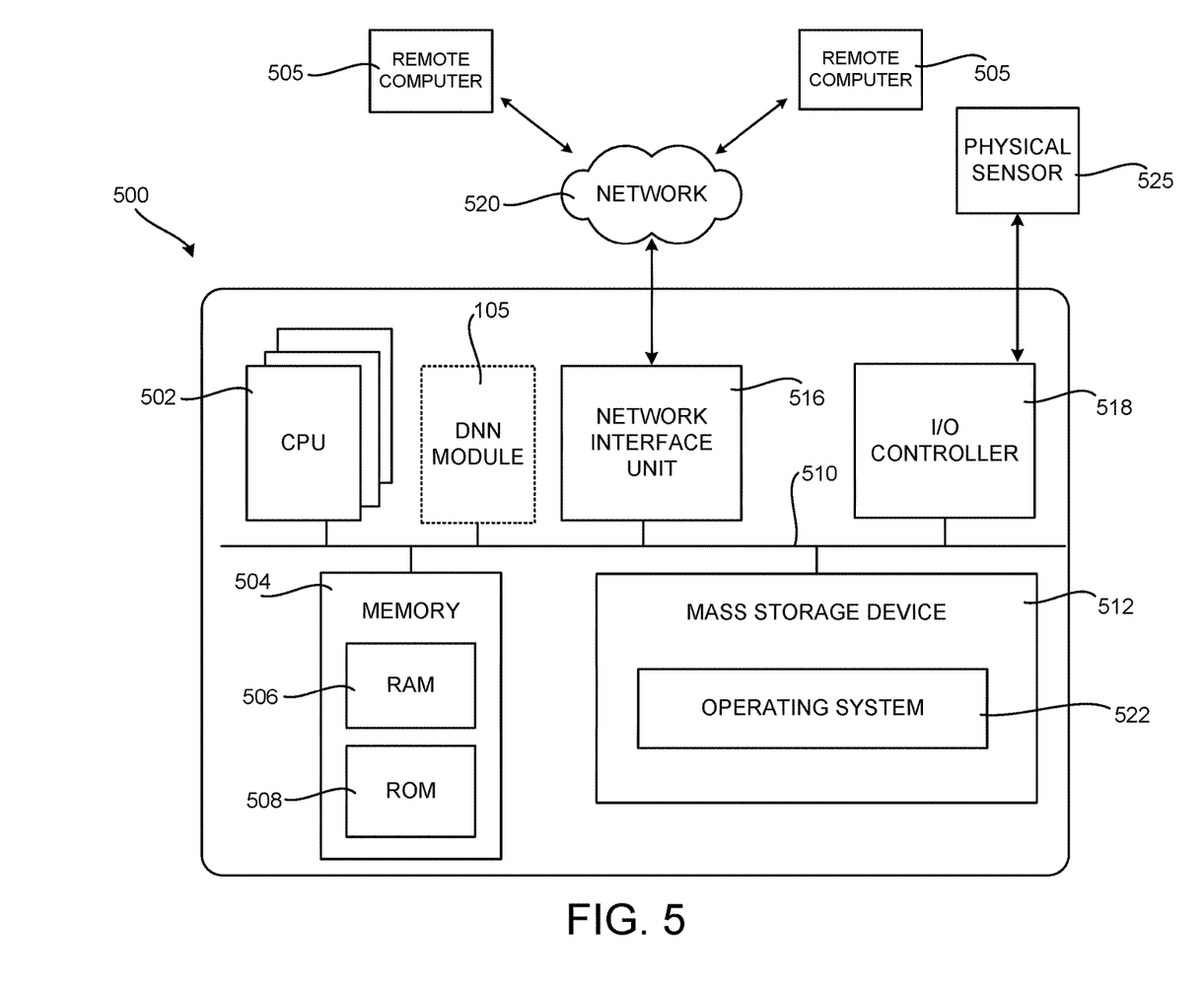
FIG. 5 is a computer architecture diagram showing an illustrative computer hardware and software architecture for a computing device that can act as an application host for the technologies presented herein, according to one embodiment.

FIG. 5 is a computer architecture diagram showing an illustrative computer hardware and software architecture for a computing device that can act as an application host for the DNN processor 112 presented herein. In particular, the architecture illustrated in FIG. 5 can be utilized to implement a server computer, mobile phone, an e-reader, a smartphone, a desktop computer, an AR/VR device, a tablet computer, a laptop computer, or another type of computing device suitable for use with the DNN processor 112.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing an operating system 522, application programs, and other types of programs. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
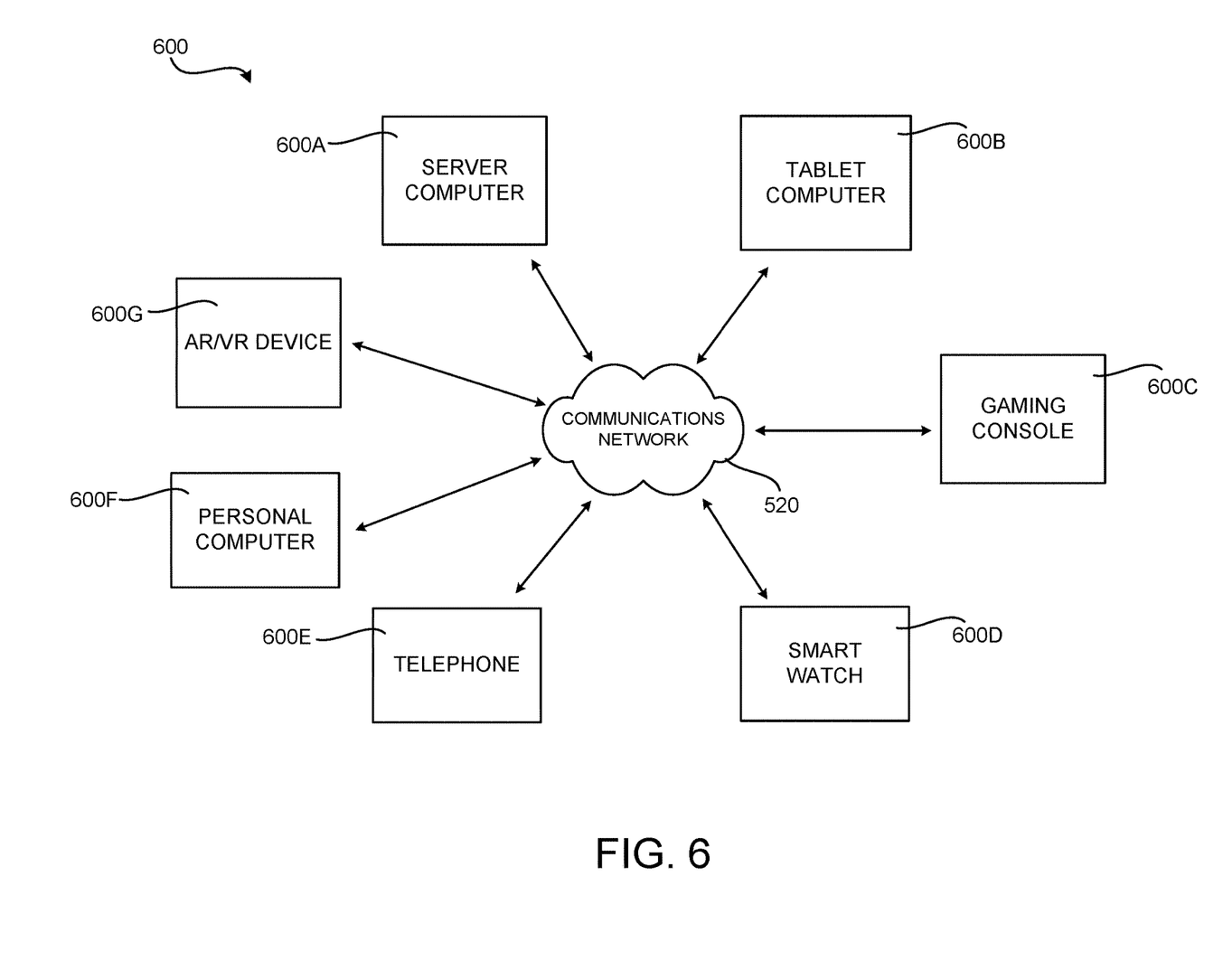
FIG. 6 is a network diagram illustrating a distributed computing environment in which aspects of the disclosed technologies can be implemented, according to various embodiments presented herein.

FIG. 6 is a network diagram illustrating a distributed network computing environment 600 in which aspects of the disclosed technologies can be implemented, according to various embodiments presented herein. As shown in FIG. 6, one or more server computers 600A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 600B, a gaming console 600C, a smart watch 600D, a telephone 600E, such as a smartphone, a personal computer 600F, and an AR/VR device 600G.

In a network environment in which the communications network 520 is the Internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G can be equipped with an operating system operable to support one or more computing applications or terminal sessions such as a web browser (not shown in FIG. 6), or other graphical user interface (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over an exemplary communications network 520. A participating user (not shown in FIG. 6) may request access to specific data and applications housed in whole or in part on the server computer 5800A. These data may be communicated between the client computing devices 600B-600G and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: receiving, at a resource and power management (RPM) processor core, a request to execute a deep neural network (DNN) workload; dividing the DNN workload into a plurality of workload fragments; determining whether a workload fragment of the plurality of the workload fragments is to be statically or dynamically allocated to one of a plurality of DNN processors; responsive to determining that the workload fragment is to be statically assigned to one of the plurality of DNN processors, assigning the workload fragment to a predetermined DNN processor of the plurality of DNN processors; and responsive to determining that the workload fragment is to be dynamically assigned to one of the plurality of DNN processors, assigning the workload fragment to a DNN processor of the plurality of DNN processors based upon an estimated time to completion of workload fragments executing on the plurality of DNN processors.

Clause 2. The computer-implemented of clause 1, wherein each of the plurality of DNN processors is configured to maintain a workload fragment queue, and wherein assigning the workload fragment to one of the plurality of DNN processors comprises enqueuing the workload fragment on a workload fragment queue associated with the one of the plurality of DNN processors.

Clause 3. The computer-implemented of clauses 1 or 2, wherein each of the plurality of DNN processors is configured to generate an interrupt upon completing execution of a workload fragment, and wherein a message indicating that the workload fragment has completed execution is transmitted to the RPM processor core responsive to the interrupt.

Clause 4. The computer-implemented of any of clauses 1-3, wherein the request to execute the DNN workload is generated by one of a plurality of processor cores communicatively coupled to the RPM processor core.

Clause 5. The computer-implemented of any of clauses 1-4, wherein the RPM processor core is further configured to cause power to be removed from a DNN processor of the plurality of DNN processors responsive to determining that the DNN processor is idle.

Clause 6. The computer-implemented of any of clauses 1-5, wherein the estimated time to completion of workload fragments executing on the plurality of DNN processors is determined based upon data indicating a percentage completion of execution of the workload fragments executing on the plurality of DNN processors.

Clause 7. The computing device of any of clauses 1-6, wherein the workload fragments are configured to store the data indicating a percentage completion of execution of the workload fragments executing on the plurality of DNN processors.

Clause 8. A computing system, comprising: a plurality of deep neural network (DNN) processors; and a plurality of processor cores, one of the plurality of processor cores comprising a resource and power management (RPM) processor core, the RPM processor core configured to receive a request to execute a deep neural network (DNN) workload from one of the plurality of processor cores, divide the DNN workload into a plurality of workload fragments, and assign a selected workload fragment of the plurality of workload fragments to one of the plurality of DNN processors based upon an estimated time to completion of workload fragments executing on the plurality of DNN processors.

Clause 9. The computing system of clause 8 wherein the RPM processor core is further configured to: determine whether the selected workload fragment is to be statically or dynamically allocated to one of the plurality of DNN processors; and responsive to determining that the selected workload fragment is to be statically assigned to one of the plurality of DNN processors, assigning the workload fragment to a predetermined DNN processor of the plurality of DNN processors.

Clause 10. The computing system of clauses 8 or 9, wherein each of the plurality of DNN processors is configured to maintain a workload fragment queue, and wherein assigning the selected workload fragment to one of the plurality of DNN processors comprises enqueuing the workload fragment on a workload fragment queue associated with the one of the plurality of DNN processors.

Clause 11. The computing system of any of clauses 8-10, wherein each of the plurality of DNN processors is configured to generate an interrupt upon completing execution of a workload fragment, and wherein a message indicating that the workload fragment has completed execution is transmitted to the RPM processor core responsive to the interrupt.

Clause 12. The computing system of any of clauses 8-11, wherein the RPM processor core is further configured to cause power to be removed from a DNN processor of the plurality of DNN processors responsive to determining that the DNN processor is idle.

Clause 13. The computing system of any of clauses 8-12, wherein the estimated time to completion of workload fragments executing on the plurality of DNN processors is determined based upon data indicating a percentage completion of execution of the workload fragments executing on the plurality of DNN processors.

Clause 14. The computing system of any of clauses 8-13, wherein the workload fragments are configured to store the data indicating a percentage completion of execution of the workload fragments executing on the plurality of DNN processors.

Clause 15. A processor core configured to: receive a request to execute a deep neural network (DNN) workload; divide the DNN workload into a plurality of workload fragments; and assign a selected workload fragment of the plurality of workload fragments to one of a plurality of DNN processors based upon an estimated time to completion of workload fragments currently executing on the plurality of DNN processors.

Clause 16. The processor core of clause 15, further configured to: determine whether the selected workload fragment is to be statically or dynamically allocated to one of the plurality of DNN processors; and responsive to determining that the selected workload fragment is to be statically assigned to one of the plurality of DNN processors, assign the workload fragment to a predetermined DNN processor of the plurality of DNN processors.

Clause 17. The processor core of clauses 15 or 16, wherein each of the plurality of DNN processors is configured to maintain a workload fragment queue, and wherein assign the selected workload fragment to one of the plurality of DNN processors comprises enqueuing the workload fragment on a workload fragment queue associated with the one of the plurality of DNN processors.

Clause 18. The processor core of any of clauses 15-17, wherein each of the plurality of DNN processors is configured to generate an interrupt upon completing execution of a workload fragment, and wherein a message indicating that the workload fragment has completed execution is transmitted to the processor core responsive to the interrupt.

Clause 19. The processor core of any of clauses 15-18, wherein the estimated time to completion of workload fragments executing on the plurality of DNN processors is determined based upon data indicating a percentage completion of execution of the workload fragments executing on the plurality of DNN processors.

Clause 20. The computing device of any of clauses 15-19, wherein the processor core is further configured to cause power to be removed from a DNN processor of the plurality of DNN processors responsive to determining that the DNN processor is idle.

Based on the foregoing, it should be appreciated that technologies have been disclosed herein for management of workloads for a DNN processor. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
receiving, at a resource and power management (RPM) processor core, a request to execute a deep neural network (DNN) workload;
dividing, by way of the RPM processor core, the DNN workload into a plurality of workload fragments, the workload fragments configured to store data indicating a percentage completion of execution in an execution time scoreboard;
determining, by way of the RPM processor core, whether a workload fragment of the plurality of the workload fragments is to be statically or dynamically allocated to one of a plurality of DNN processors, the DNN processors comprising a plurality of neural processing elements, each of the plurality of DNN processors configured to maintain a workload fragment queue;
responsive to determining that the workload fragment is to be statically assigned to one of the plurality of DNN processors, enqueuing the workload fragment on the workload fragment queue of a predetermined DNN processor of the plurality of DNN processors, the predetermined DNN processor identified by the workload fragment;

storing the execution time scoreboard, the execution time scoreboard comprising the data indicating the percentage completion of the execution of workload fragments currently executing on the plurality of DNN processors;

responsive to determining that the workload fragment is to be dynamically assigned to one of the plurality of DNN processors;

computing an estimated time to completion of the execution of the workload fragments currently executing on the plurality of DNN processors based on the execution time scoreboard; and enqueuing, by way of the RPM processor core, the workload fragment on the workload fragment queue of a DNN processor of the plurality of DNN processors based upon the estimated time to completion of the execution of the workload fragments currently executing on the plurality of DNN processors;

determining, by way of the RPM processor core, that one or more of the plurality of DNN processors are idle; and removing power from the one or more of the plurality of DNN processors that are determined to be idle.

2. The computer-implemented of claim 1, wherein each of the plurality of DNN processors is configured to generate an interrupt upon completing execution of a workload fragment, and wherein a message indicating that the workload fragment has completed execution is transmitted to the RPM processor core responsive to the interrupt.

3. The computer-implemented of claim 1, wherein the request to execute the DNN workload is generated by one of a plurality of processor cores communicatively coupled to the RPM processor core.

4. A computing system, comprising:

a plurality of deep neural network (DNN) processors, each of the plurality of DNN processors configured to maintain a workload fragment queue; and a plurality of processor cores, one of the plurality of processor cores comprising a resource and power management (RPM) processor core, the RPM processor core configured to:

receive a request to execute a deep neural network (DNN) workload from one of the plurality of processor cores;

divide the DNN workload into a plurality of workload fragments, the workload fragments configured to store data indicating a percentage completion of execution in an execution time scoreboard;

determine whether a workload fragment of the plurality workload fragments is to be statically or dynamically allocated to one of the plurality of DNN processors;

responsive to determining that the workload fragment is to be statically allocated to one of the plurality of DNN processors, enqueue the workload fragment on the workload fragment queue of a predetermined DNN processor of the plurality of DNN processors, the predetermined DNN processor identified by the workload fragment;

store the execution time scoreboard, the execution time scoreboard comprising the data indicating the percentage completion of the execution of workload fragments currently executing on the plurality of DNN processors;

responsive to determining that the workload fragment is to be dynamically allocated to one of the plurality of DNN processors;

compute an estimated time to completion of the execution of the workload fragments currently executing on the plurality of DNN processors based on the execution time scoreboard; and enqueue the workload fragment of the plurality of workload fragments on the workload fragment queue of one of the plurality of DNN processors based upon the estimated time to completion of the execution of the workload fragments currently executing on the plurality of DNN processors;

determine that one or more of the plurality of DNN processors are idle; and remove power from the one or more of the plurality of DNN processors that are determined to be idle.

5. The computing system of claim 4, wherein each of the plurality of DNN processors is configured to generate an interrupt upon completing execution of a workload fragment, and wherein a message indicating that the workload fragment has completed execution is transmitted to the RPM processor core responsive to the interrupt.

6. A processor core configured to:

receive a request to execute a deep neural network (DNN) workload;

divide the DNN workload into a plurality of workload fragments, the workload fragments configured to store data indicating a percentage completion of execution in an execution time scoreboard;

determine whether a workload fragment of the plurality of workload fragments is to be statically or dynamically allocated to one of a plurality of DNN processors, each of the plurality of DNN processors configured to maintain a workload fragment queue;

responsive to determining that the workload fragment is to be statically assigned to one of the plurality of DNN processors, enqueue the workload fragment on the workload fragment queue of a predetermined DNN processor of the plurality of DNN processors, the predetermined DNN processor identified by the workload fragment;

store the execution time scoreboard, the execution time scoreboard comprising the data indicating the percentage completion of the execution of workload fragments currently executing on the plurality of DNN processors;

responsive to determining that the workload fragment is to be dynamically assigned to one of the plurality of DNN processors;

compute an estimated time to completion of the execution of the workload fragments currently executing on the plurality of DNN processors based on the execution time scoreboard; and enqueue a workload fragment of the plurality of workload fragments on the workload fragment of a DNN processor of the plurality of DNN processors based upon the estimated time to completion of the execution of the workload fragments currently executing on the plurality of DNN processors;

determine that one or more of the plurality of DNN processors are idle; and cause power to be removed from the one or more of the plurality of DNN processors that are determined to be idle.

7. The processor core of claim 6, wherein each of the plurality of DNN processors is configured to generate an interrupt upon completing execution of a workload fragment, and wherein a message indicating that the workload fragment has completed execution is transmitted to the processor core responsive to the interrupt.

* * * * *